(12) United States Patent
Kleen et al.

(10) Patent No.: US 9,694,681 B2
(45) Date of Patent: Jul. 4, 2017

(54) DEVICE FOR AUTOMATICALLY DRIVING A VEHICLE

(71) Applicant: VOLKSWAGEN AKTIENGESELLSCHAFT, Södertälje (SE)

(72) Inventors: Andro Kleen, Braunschweig (DE); Helge Schäfer, Braunschweig (DE); Daniel Ricknäs, Stockholm (SE); Marc-Michael Meinecke, Sassenburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 15/026,625

(22) PCT Filed: Sep. 30, 2014

(86) PCT No.: PCT/EP2014/070981
§ 371 (c)(1),
(2) Date: Apr. 1, 2016

(87) PCT Pub. No.: WO2015/049255
PCT Pub. Date: Apr. 9, 2015

(65) Prior Publication Data
US 2016/0214483 A1 Jul. 28, 2016

(30) Foreign Application Priority Data

Oct. 1, 2013 (DE) .................. 10 2013 110 909

(51) Int. Cl.
*G01C 22/00* (2006.01)
*B60K 35/00* (2006.01)
(Continued)

(52) U.S. Cl.
CPC ............. *B60K 35/00* (2013.01); *B60W 30/12* (2013.01); *B60W 30/16* (2013.01); *B60W 50/14* (2013.01);
(Continued)

(58) Field of Classification Search
CPC ........... B60K 35/00; B60K 2350/1096; B60W 30/12; B60W 30/16; B60W 50/14;
(Continued)

(56) References Cited

U.S. PATENT DOCUMENTS 9,014,915 B2 * 4/2015 Chatterjee ............. B60W 50/08
340/576
9,194,168 B1 * 11/2015 Lu ........................... E05F 15/70
(Continued)

FOREIGN PATENT DOCUMENTS

DE          10131478 A1    1/2003
DE    102007058437 A1    6/2009
(Continued)

OTHER PUBLICATIONS

Search Report for International Patent Application No. PCT/EP2014/070981; Dec. 23, 2014.

*Primary Examiner* — McDieunel Marc
(74) *Attorney, Agent, or Firm* — Barnes & Thornburg LLP

(57) ABSTRACT

A device having at least one sensor, a controller, and a display device designed for a vehicle which is configured for at least partial automatic driving. The at least one sensor is configured to acquire information items. The device senses an automatic driving state in which the vehicle drives automatically and displays simultaneously on the display device, in the automatic driving state, conditions which are to be complied with to maintain the automatic driving state, together with information indicating whether the respective (Continued)

condition is met. Also disclosed is a device configured to determine compliance with the conditions as a function of the information items.

10 Claims, 3 Drawing Sheets

(51) Int. Cl.
    *B60W 50/14*      (2012.01)
    *B60W 30/12*      (2006.01)
    *B60W 30/16*      (2012.01)
    *G05D 1/00*      (2006.01)

(52) U.S. Cl.
    CPC .... *G05D 1/0088* (2013.01); *B60K 2350/1096* (2013.01); *B60W 2050/146* (2013.01); *B60W 2520/10* (2013.01); *B60W 2550/10* (2013.01); *B60W 2550/141* (2013.01); *B60W 2550/308* (2013.01)

(58) Field of Classification Search
    CPC ....... B60W 2050/146; B60W 2520/10; B60W 2550/10; B60W 2550/141; B60W 2550/308; B05D 1/0088
    USPC .............................................. 701/23; 700/245
    See application file for complete search history.

(56) References Cited

U.S. PATENT DOCUMENTS

| | | | |
|---|---|---|---|
| 9,298,184 B2* | 3/2016 | Bartels | B60W 50/10 |
| 9,436,182 B2* | 9/2016 | Nemec | G05D 1/0055 |
| 9,493,116 B2* | 11/2016 | Kiefer | G08B 6/00 |
| 9,551,992 B1* | 1/2017 | Barton-Sweeney | G05D 1/0212 |
| 2003/0217880 A1 | 11/2003 | Isogai et al. | |

FOREIGN PATENT DOCUMENTS

| | | |
|---|---|---|
| DE | 102009041198 A1 | 4/2011 |
| DE | 102009048954 A1 | 4/2011 |
| EP | 2143587 A2 | 1/2010 |
| EP | 2392501 A2 | 12/2011 |

\* cited by examiner

DEVICE FOR AUTOMATICALLY DRIVING A VEHICLE

PRIORITY CLAIM

This patent application is a U.S. National Phase of International Patent Application No. PCT/EP2014/070981, filed 30 Sep. 2014, which claims priority to German Patent Application No. 10 2013 110 909.8, filed 1 Oct. 2013, the disclosures of which are incorporated herein by reference in their entirety.

FIELD

Illustrative embodiments relate to a device for automatically driving a vehicle.

SUMMARY

The progressive development of vehicle electronics allows the use of automatic driving functions in which both the longitudinal control and the lateral control of the vehicle is carried out automatically (without any manual actuation on the part of a person). On account of the homogeneous boundary conditions, use of such a system for automatically driving a vehicle is already conceivable, especially in situations of congested traffic. In particular in the case of trucks, it is possible as a result to conserve important resources, such as fuel, but also to keep down the driver's driving times. If the vehicle is being driven automatically, the driver's attention can be diverted away from the traffic and focused on other activities, for example, the use of a cell phone.

Since the vehicle can only be automatically driven in congested traffic under certain prerequisites, it is of central importance that the driver can register relatively quickly what state an automatic driving function is currently in. In addition, the driver should be able to overview easily the system limits of a system for automatically driving a vehicle.

Illustrative embodiments provide a device for a vehicle that achieves the aims described above.

BRIEF DESCRIPTION OF THE FIGURES

Disclosed embodiments are explained in detail below with reference to the figures.

DETAILED DESCRIPTION OF THE DISCLOSED EMBODIMENTS

Figure 1:
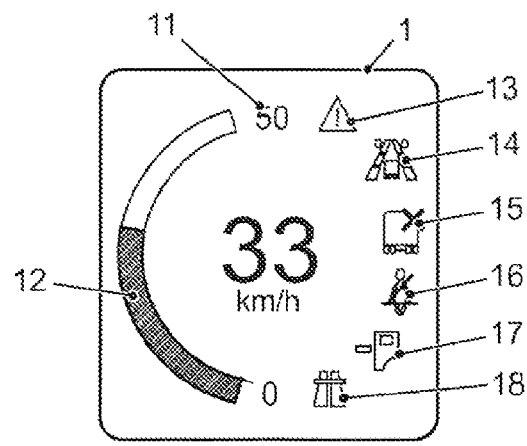
FIG. 1 shows a display in the automatic driving state.

A device for a vehicle is provided. In this case, the device is designed for at least partially automatically driving the vehicle and comprises one or more sensors, a controller and a display. The sensor or sensors are designed so as to sense one or more items of information. The device is in turn designed so as to sense an automatic driving state in which the vehicle is driving automatically and so as in this automatic driving state (i.e., when the automatic driving state has been sensed) to show simultaneously on the display one or more predetermined conditions that have to be met to maintain the automatic driving state, together with an indication as to whether or not the respective condition is satisfied. In addition, the device is designed so as to determine, dependent on the item or items of information, whether or not the respective condition is met.

In other words, for the case where the vehicle is being driven automatically (i.e., the longitudinal and lateral guidance of the vehicle is controlled by a congested-traffic function), the device shows on its display the multiple conditions together with the indication as to whether the respective condition is satisfied. As a result, on the one hand the driver of the vehicle is provided with a quick overview of which conditions are to be met to maintain the automatic driving state. In addition, the driver quickly recognizes if one of these conditions is no longer met.

The item or items of information that is/are sensed by the sensor or sensors is/are in this case selected in particular from the following set of information:

A current speed of the vehicle.

An item of information as to whether the leading vehicle located directly in front of the vehicle is at a sufficiently small distance from the vehicle. The leading vehicle refers to the vehicle that is driving directly in front of the vehicle in the same lane as the vehicle. Only if the distance from this leading vehicle is below a predetermined distance threshold can the vehicle automatically drive behind the leading vehicle.

An item of information as to whether there is a lane marking on a road currently being driven along by the vehicle. So that the vehicle can automatically drive in the lane of the leading vehicle, there should be corresponding lane markings on the roadway or on the road. If corresponding lane markings are not sensed, the automatic driving should be ended.

An open state of a door of the vehicle. For safety reasons, only if all the doors of the vehicle are closed can the automatic driving state be maintained.

An item of information as to whether the driver of the vehicle is using a seatbelt. For reasons of safety, the driver should be using a seatbelt when the vehicle is being driven automatically.

An item of information as to whether there is an object (for example, a pedestrian) in front of the vehicle within a predetermined distance from the vehicle. If an object that is not a vehicle is sensed within the predetermined distance in front of the vehicle, the automatic driving of the vehicle should be terminated for safety reasons.

A type of road currently being driven along by the vehicle. Only if the road currently being driven along by the vehicle is a freeway or a road that is separated from the lane for oncoming traffic by a barrier that cannot be driven over by the vehicle can the automatic driving be activated or maintained.

On the basis of the items of information, the conditions that have to be satisfied to maintain the automatic driving state can be shown to the driver in a compact form.

With the aid of the current speed of the vehicle, a probability with which the automatic driving state will be ended on account of an excessive speed can be shown on the display.

The automatic driving state should only be maintained for speeds of the vehicle below a maximum speed (for example, 50 km/h). Should the speed of the vehicle approach this maximum speed, the increasing probability of the termination of the automatic driving state can be shown by a change in color of a speed indication on the display.

In particular, the disclosed device goes into a warning state if one of the conditions to be met for the automatic driving state is no longer satisfied. In the warning state, the condition that is no longer satisfied can then be shown together with an identifier, which identifies that the corresponding condition is no longer satisfied. In this case, the no longer satisfied condition may be shown larger than how it is shown when it is satisfied. The unsatisfied condition is shown in a middle region of the display, to draw the attention of the viewer to this unsatisfied condition. In addition, an operator control element is activated or sensitized (i.e., switched to a sensitive state to be able to respond to an actuation of the operator control element). If the actuation of the then activated operator control element is sensed, the automatic driving of the vehicle is ended, so that the disclosed device changes from the warning state to a manual driving state, in which the vehicle is manually driven by the driver.

In other words, in the event in which at least one of the conditions is no longer satisfied, this no longer satisfied condition is clearly shown to the viewer. In addition, a change is made to the warning state, in which the operator control element can be actuated to end the automatic driving.

In the warning state, a further operator control element may also be activated or sensitized (i.e., the further operator control element is switched to a sensitive state to be able to respond to an actuation of the further operator control element). If the actuation of the further operator control element is sensed, the disclosed device changes from the warning state back into the automatic driving state, in which the disclosed device remains at least for a predetermined time.

The activation or sensitization of the further operator control element takes place in particular only under certain conditions. For example, the further operator control element may be activated if either the maximum speed has been exceeded or if the distance from the leading vehicle has become too great. This may be the case for example, if congested traffic has temporarily begun to move more freely. If the driver in this case registers that the congested traffic situation will resume again in just a few seconds, the driver can in this case enforce the maintenance of the automatic driving state even though certain conditions or prerequisites for maintaining the automatic driving state are infringed. If the conditions for maintaining the automatic driving state are still infringed after a predetermined time period (for example, 10 s) after actuation of the further operator control element, the disclosed device once again changes to the warning state. The driver can then once again actuate the further operator control element, as long as in this case a further predetermined time period during which the conditions maintaining the automatic driving state are infringed is not exceeded. By the actuation of the further operator control element, the driver can altogether extend the automatic driving state for example, three times for a time period of 10 seconds in each case. The possibility of actuating the further operator control element may in this case also be offered by means of a text shown on the display and/or be illustrated by a further graphical representation on the display.

The further operator control element should not be confused with a special operator control element with which the attention of the driver is sensed. Such a special operator control element, which is also known as a dead man's switch, is actually not required. Therefore, a disclosed device does not have such a special operator control element.

If, after a predetermined time interval after the beginning of the warning state, no actuation of the operator control element (and of the further operator control element) is sensed, the disclosed device goes in particular into a substate of the warning state. In this substate, a request for the takeover of manual driving of the vehicle is shown to a driver of the vehicle together with an explanatory text substantially on the entire display. In addition, a graphical handling request for the takeover of driving of the vehicle may be shown to the driver of the vehicle on the display in alternation with this representation.

In other words, in this escalation step, only an indication of the imminent takeover of driving of the vehicle is shown on the display in various forms, so that other items of information (display concepts) are no longer shown on the display. At the same time, a critical warning tone may be repeatedly sounded and in addition a count-down counter counted down.

If within a further predetermined time interval no actuation of the operator control element (or of the further operator control element) is sensed, a change is made to a braking state. In this braking state, the disclosed device shows the braking state on the display and brakes the vehicle to a standstill. The remaining time until the beginning of braking may in this case be shown on the display.

The braking state, and with it the braking to a standstill, have the effect of preventing that the vehicle is driven automatically for too long when the conditions for automatic driving are no longer satisfied without any driver feedback.

In particular, the disclosed device changes from the braking state to a safe state if the standstill of the vehicle is sensed. In this safe state, on the one hand the safe state and on the other hand an actuating option are shown on the display, the actuating option indicating how the driver can change from the safe state to the manual driving state.

If during automatic driving no driver feedback takes place even though at least one condition for automatic driving is no longer satisfied, accordingly the vehicle is brought automatically into the safe state by braking.

If in the safe state the simultaneous actuation of the brake of the vehicle and an operator control element is sensed, the disclosed device changes to the manual driving state, in which the vehicle can be manually driven by the driver quite normally.

The required combined actuation of the brake and the operator control element for changing to the manual driving state is intended to prevent that the safe state is left inadvertently (for example, due to a driver being unconscious).

In particular, the automatic driving state may be ended by the actuation of a terminating operator control element, whereby the disclosed device goes into the manual driving state, in which the vehicle is manually driven by the driver of the vehicle quite normally.

The actuation of the terminating operator control element offers a possibility of leaving the automatic driving state in an easy way at any time to return to the manual driving state.

A vehicle which comprises a disclosed device may also be provided.

A device for a vehicle that is designed for automatic driving may also be provided, the device comprising at least one sensor and a controller, but not necessarily a display. The at least one sensor is in this case designed so as to sense one or more items of information, for example, from the set of information described above. The device is designed so as to sense on the basis of the item(s) of information the automatic driving state and so as to sense the multiple conditions that are to be met to maintain the automatic driving state.

The following variants exist for the disclosed device:

If at least one of these conditions is no longer met, the device according to the first variant activates the operator control element (for example, a switch or a button) and changes to the manual driving state if the device senses the actuation of the operator control element.

According to the second variant, the device brakes the vehicle to a standstill to go into the safeguarded state if at least one of the conditions is no longer met and no driver feedback is sensed over a predetermined time period. The device comes out of this safeguarded state only if the device senses on the one hand the actuation of the brakes of the vehicle and on the other hand the actuation of a further operator control element (for example, the operator control element described above for changing to the manual driving state).

The two variants described above of a disclosed device accordingly do not necessarily comprise the display described above and the display concepts described with it. It is of course also possible that the two variants include the display described above and the display concepts described with it.

The disclosed embodiments the driver quickly to register the status in which the vehicle is during automatic driving and in particular become aware that automatic driving can be continued under certain prerequisites. This knowledge and knowledge of the actual automatic driving capabilities are closely linked with the training of the driver to be appropriately familiar with the system. This training to be appropriately familiar with the system is one of the decisive prerequisites in the way in which the driver and the system work together for a successful interaction between man and vehicle.

Automatic driving may only be used within certain limits (for example, only in congested traffic), so that the driver must necessarily be able to resume the task of driving with or virtually without any time reserve. The disclosed embodiments allow the driver in quickly gaining an overview of the current automatic driving situation, or of the probability that he must soon take over the vehicle again, in spite of the secondary task being performed. In particular, the disclosed embodiments ensure that the ending of the automatic driving and the request for the driving task to be resumed can be clearly seen by the driver.

The disclosed embodiments are suitable in particular for motor vehicles, but may also be used for track-guided vehicles as well as aircraft or ships.

In FIG. 1, a display 1 in the automatic driving state is shown. In this case, on the one hand the current speed 12 of the automatically driving vehicle is shown as a bar and as a numerical value in the middle of the display 1. On the other hand, the highest speed 11 (maximum speed), which represents a system limit from which automatic driving is no longer possible, is shown. If the current speed 12 exceeds the maximum speed 11, or if for example, the leading vehicle is lost (moving away at a speed of over 50 km/h as a result of congested traffic beginning to move freely again), a transfer procedure is initiated, at the end of which the driver himself performs the task of driving the vehicle again. In this way, the speed bar 12 at the same time represents the probability of a takeover (i.e., the probability with which a change will be made from the automatic driving state to the manual driving state). Since this probability of a takeover increases with increasing speed (longer bar), the speed bar 12 takes on a color (for example, yellowish) if a predetermined threshold value (for example, 45 km/h) is exceeded, so that the display 1 assumes a warning character.

On the right side of the display 1, necessary prerequisites for the automatic driving state are shown as symbols 13-18. The automatic driving state can only be maintained if these prerequisites or conditions are satisfied. The meaning of the symbols 13-18 is explained below.

Symbol 13: The current speed 12 of the vehicle exceeds the maximum speed 11.

Symbol 14: No lane markings are detected on the roadway currently being driven along by the vehicle.

Symbol 15: No leading vehicle is detected. This is generally the case whenever the distance between the vehicle driving directly in front of the vehicle and the vehicle exceeds a predetermined threshold value.

Symbol 16: The driver of the vehicle is not wearing a seatbelt or a door of the vehicle is open.

Symbol 17: An object that is not a vehicle is sensed in front of the vehicle.

Symbol 18: The type of road on which the vehicle is currently driving along does not correspond to a type of road for which automatic driving is designed.

As long as all the necessary prerequisites or conditions for the automatic driving state are satisfied, although the symbols 13-18 are visible on the display 1 they are grayed out, from which the driver recognizes that all the conditions are satisfied.

In other words, the following prerequisites or conditions must be satisfied so that the automatic driving state is maintained:

The current speed 12 of the vehicle is below the maximum speed 11.

Lane markings are detected.

A leading vehicle is detected.

The driver is wearing a seatbelt and no door of the vehicle is open.

An object other than another vehicle is not detected in front of the vehicle.

The vehicle is driving on a type of road that is authorized for automatic driving (for example, a freeway).

Figure 2:
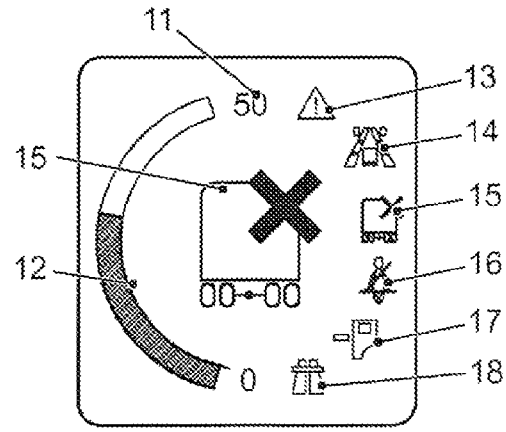
FIG. 2 shows a display in the warning state.

Showing the symbols 13-18 makes the driver aware of the system limits and consequently helps to train an appropriate familiarity with the system and to assist awareness of the system. If it is sensed that one of the conditions for automatic driving is no longer satisfied, the state of automatic driving can no longer be maintained and the driving task is transferred back from the disclosed device to the driver. If this is the case (that is to say at least one condition 15 for automatic driving is no longer satisfied), the disclosed device goes into a warning state and, in a first step, the corresponding symbol 15, which represents the condition that is no longer satisfied, is highlighted in comparison with the other symbols. In addition, this condition 15 (for example, leading vehicle is no longer there) is shown in the middle of the display 1 enlarged in comparison with the other conditions, as it is depicted in FIG. 2. At the same time, a warning tone of a lower priority may be sounded and/or the driver may be requested by text, for example, on the display 1 (for example, the display cluster), to resume the task of driving the vehicle and for this purpose to actuate a certain operator control element (for example, an "OK" button on the steering wheel of the vehicle), thereby to confirm and initiate the manual takeover of driving the vehicle. In addition, the driver may be shown on the display 1 a count-down counter, which indicates in seconds the remaining time within which the driver should resume the task of manual driving. This first step is shown for a predetermined time period (for example, 3 seconds).

Figure 3:
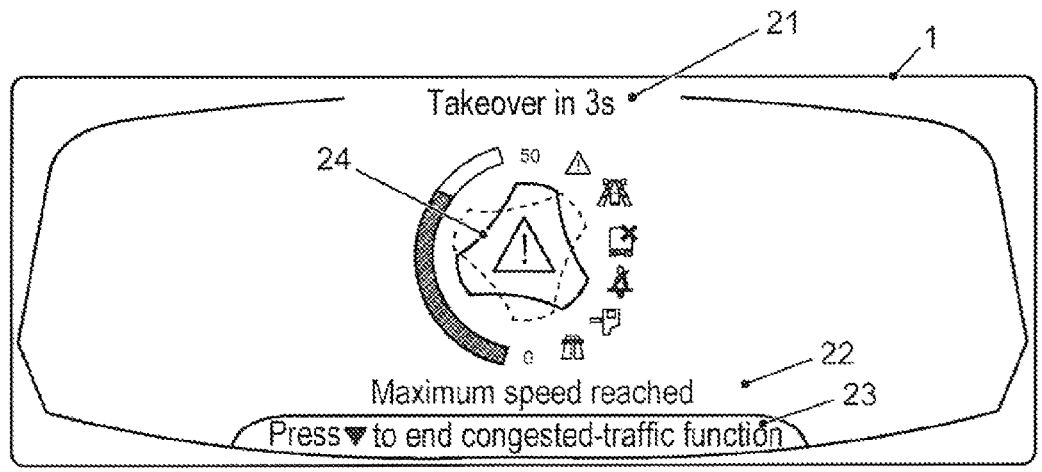
FIGS. 3 and 4 show displays in the case of a prolonged warning state.
Figure 4:
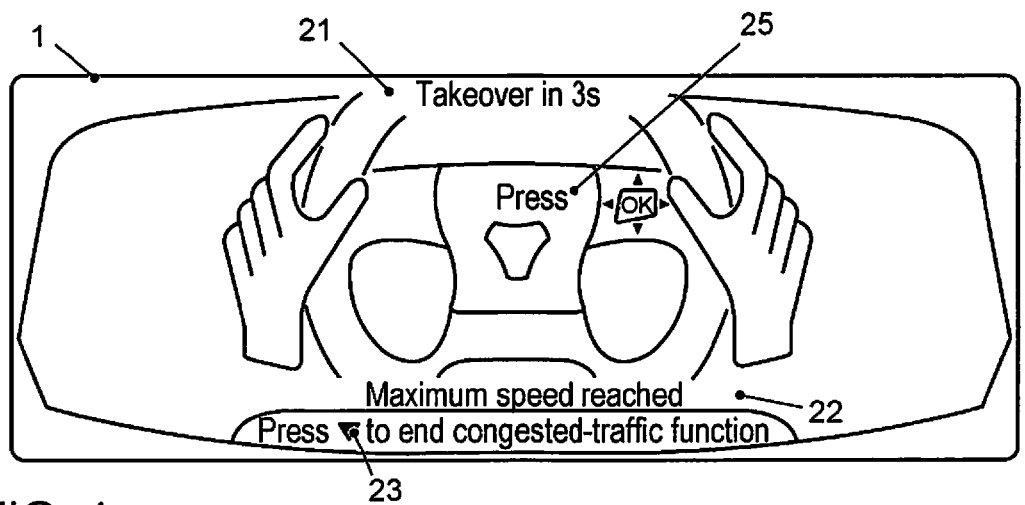

If no driver feedback takes place within this predetermined time period, the disclosed device goes into a special substate of the warning state and, in a second step, a request 24 for the takeover of the driving task is shown on the entire display 1 (and no longer only in a partial region in the case of FIGS. 1 and 2), as is depicted in FIG. 3. Other display concepts are no longer shown on the display 1 in this substate or second step. At the same time, a critical warning tone in comparison with the first step may be repeatedly sounded. In addition, the count-down counter may in turn be displayed and an explanatory text 22 may explain to the driver in a written form which condition for automatic driving is no longer satisfied.

To assist the driver further, in this substate a graphical handling request 25 for the takeover of the driving task is presented on the display 1 alternately with the representation on the display 1 that is shown in FIG. 3. The graphical handling request 25 schematically shows a steering wheel and the operator control element that is to be actuated for the takeover of the driving task. Also in the case of this representation, the count-down counter 21 may be displayed and moreover the driver may be requested by means of a text to resume the driving task.

Under certain conditions, in the warning state an option is offered by the disclosed device to leave the warning state and return again to the automatic driving state. This option is offered for example, whenever the maximum speed is exceeded and/or no leading vehicle is sensed any longer even though the driver recognizes that the congested traffic has only begun to move more freely temporarily or for a phase. By the actuation of a further operator control element (for example, a steering wheel button ("upward arrow")), the driver can in this case resume the automatic driving state a predetermined number of times (for example, 3 times) for a predetermined time period in each case (for example, 10 seconds). This option may be offered on the display 1 by means of text and/or be illustrated by a corresponding graphical representation.

In the state of automatic driving in congested traffic, it may happen that objects (not vehicles but for example, persons) are detected in the space between the vehicle and the leading vehicle. In this case, the corresponding symbol 17 in the display 1 is highlighted and shown enlarged in the middle of the display 1. In addition, the driver is informed with the aid of a text that an object in the lane has been detected in front of the vehicle and that for this reason the vehicle will not continue to follow the leading vehicle. At the same time, the driver may be warned by means of a non-critical warning tone. If subsequently there is no longer any object detected in the space between the vehicle and the leading vehicle, and all other conditions for the automatic driving state are satisfied, the driver is nevertheless requested to confirm the continuation of the state of automatic driving by actuation of the further operator control element. Only if this confirmation takes place does the disclosed device remain in the state of automatic driving. If no confirmation takes place within a predetermined time frame, the takeover procedure described above and below is initiated. This procedure has the effect for example, of preventing medical emergencies from not being sensed in such situations.

Figure 5:
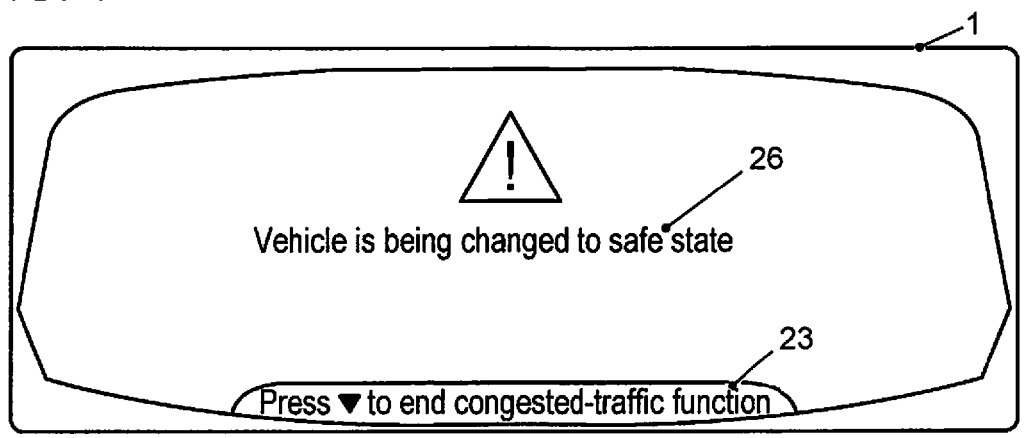
FIG. 5 shows a display in the braking state.

If in the warning state the driver does not respond and does not actuate either the operator control element or the further operator control element or a terminating operator control element with which the automatic driving can be terminated by the time the count-down counter has run down, the disclosed device goes into a braking state, in which the vehicle is braked to a standstill. In this braking state, the driver is shown on the display 1 the representation depicted in FIG. 5, in which mainly the braking state is depicted as a description of the state 26 (text: "Vehicle is being changed to safe state" and the corresponding warning symbol). The braking state, in which the vehicle is changed to a safe state, may also be additionally identified by a corresponding acoustic warning indication.

A steering wheel button ("downward arrow") or a brake pedal may serve for example, as the terminating operator control element, so that, as a result of the actuation of the corresponding steering wheel button or the actuation of the brakes of the vehicle by the driver, the automatic driving state is left and the vehicle is manually driven by the driver again. The possibility of the actuation of the steering wheel button is in this case depicted as option 23, so that it is also possible in the warning state, by the actuation of this steering wheel button, for the manual driving of the vehicle to be resumed, which corresponds to leaving the congested-traffic function or congested-traffic driving function. An exception may be formed by the braking state and a safeguarded state (see below). In these two states, under some circumstances the actuation of the terminating operator control element may not result in a changeover to manual driving of the vehicle.

Figure 6:
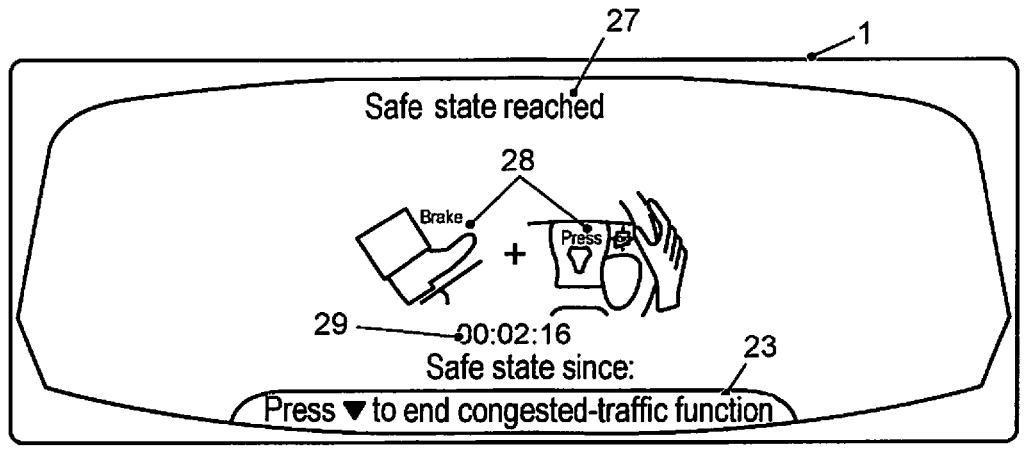
FIG. 6 shows a display in the safeguarded state.

When the vehicle has been braked to a standstill of the vehicle in the braking state, the disclosed device goes into the safe state, in which the vehicle remains stationary with the brakes on. In this safe state, the representation depicted in FIG. 6 is shown to the driver on the display 1. On the one hand, the safe state is described as a description of the state 27 (text: "Safe state reached"). On the other hand, the time period 29 since the vehicle or the disclosed device has been in the safe state is shown. By showing this time period, it is possible in the case where the driver has suffered a medical emergency for rescue teams to be informed about how long at least the driver has been incapacitated. In addition, it is shown as a handling instruction 28 on the display 1 how the safe state can be left to drive the vehicle manually again. This is possible for example, by the simultaneous actuation of the brake of the vehicle and the operator control element (for example, the "OK" button). This simultaneous combined actuation of the brake and the operator control element is intended to prevent the safeguarded state from being left inadvertently (for example, by an unconscious person).

Figure 7:
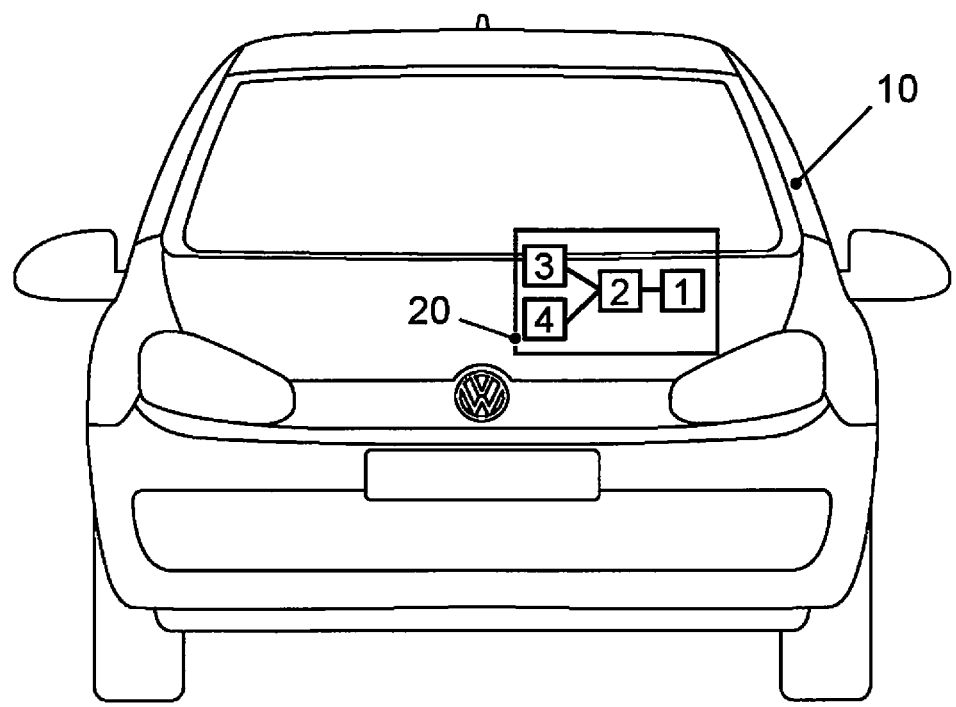
FIG. 7 shows a vehicle with a disclosed device.

Finally, FIG. 7 shows a vehicle 10 with a device 20. In this case, the device 20 comprises along with the display 1 a controller 2 and, as sensors, a camera 3 and a radar 4.

The progressive development of vehicle electronics allows the use of automatic driving functions in which both the longitudinal control and the lateral control of the vehicle is carried out automatically (without any manual actuation on the part of a person). On account of the homogeneous boundary conditions, use of such a system for automatically driving a vehicle is already conceivable, especially in situations of congested traffic. In particular in the case of trucks, it is possible as a result to conserve important resources, such as fuel, but also to keep down the driver's driving times. If the vehicle is being driven automatically, the driver's attention can be diverted away from the traffic and focused on other activities, for example, the use of a cell phone.

Since the vehicle can only be automatically driven in congested traffic under certain prerequisites, it is of central importance that the driver can register relatively quickly what state an automatic driving function is currently in. In addition, the driver should be able to overview easily the system limits of a system for automatically driving a vehicle.

DE 10 2009 048 954 A1 discloses a method and a device for automatically operating a vehicle in an autonomous driving mode that does not require any action on the part of the user. In the case for example, where congested traffic is beginning to move more freely, a driver is given a warning that an assistance system is about to be switched off, so that the attention of the driver can be brought back to the traffic situation by the corresponding warning. If the driver ignores corresponding warnings, automatic braking to a standstill occurs.

LIST OF DESIGNATIONS

1 Display
2 Controller
3 Camera
4 Radar
10 Vehicle
11 Maximum speed
12-18 Condition
20 Device
21 Count-down counter
22 Explanatory text
23 Option
24 Request for takeover
25 Handling request
26, 27 Description of state
28 Handling instruction
29 Counter

The invention claimed is:

1. A device for a vehicle designed for at least partially automatic driving, the device comprises comprising:
  at least one sensor;
  a controller; and
  a display,
  wherein the at least one sensor senses multiple items of information,
  wherein the device senses an automatic driving state in which the vehicle is driving automatically and in the automatic driving state shows simultaneously on the display multiple conditions that have to be met to maintain the automatic driving state, together with an item of information as to whether the respective condition is satisfied, and
  wherein the device determines, dependent on the multiple items of information, whether the conditions are met.

2. The device of claim 1, wherein the multiple items of information are selected from a set comprising:
  a current speed of the vehicle;
  an item of information as to whether a vehicle located in front of the vehicle is at a sufficiently small distance from the vehicle;
  an item of information as to whether there is a lane marking on a road currently being driven along by the vehicle;
  an open state of a door of the vehicle;
  an item of information as to whether a driver of the vehicle is using a seatbelt;
  an item of information as to whether there is an object in front of the vehicle within a predetermined distance from the vehicle; and
  a type of road currently being driven along by the vehicle.

3. The device of claim 1, wherein the device shows on the display, dependent on the current speed of the vehicle, a probability with which the automatic driving state will have to be ended.

4. The device of claim 1, wherein the device goes from the automatic driving state into a warning state if one of the conditions is no longer satisfied,
  wherein the device clearly highlights, in the warning state, that one of the conditions that is no longer satisfied in comparison with the other conditions and/or to shows it in a middle region of the display larger than the conditions that are satisfied and activates an operator control element, and
  wherein the device senses the actuation of the activated operator control element and to end the automatic driving of the vehicle when the actuation of the activated operator control element has been sensed in this way to go from the warning state into a manual driving state.

5. The device of claim 4, wherein the device activates a further operator control element in the warning state, senses an actuation of the further operator control element and returns from the warning state to the automatic driving state when the actuation of the activated further operator control element has been sensed.

6. The device of claim 4, wherein the device, within the warning state, goes into a substate of the warning state after a predetermined time interval after the beginning of the warning state if no actuation of the operator control element is sensed within the time interval, and
  wherein the device, in the substate, shows a request for the takeover of driving of the vehicle together with an explanatory text to a driver of the vehicle on the entire display and shows a graphical handling request for the takeover of driving of the vehicle to the driver of the vehicle on the display in alternation with this content.

7. The device of claim 4, wherein the device goes into a braking state after a predetermined time period after the beginning of the warning state if within the time period no actuation of the operator control element is sensed,
  wherein the device, in the braking state, shows the braking state on the display and, in the braking state, instructs the vehicle to be braked to a standstill, and
  wherein the device, in the warning state, displays the remaining time period on the display.

8. The device of claim 7, wherein the device senses a standstill of the vehicle goes from the braking state into a safe state if the standstill of the vehicle is sensed, and
  wherein the device, in the safe state, shows on the display the safe state and an actuating option to go from the safe state into the manual driving state.

9. The device of claim 8, wherein the device senses an actuation of a brake of the vehicle and goes from the safe state into the manual driving state when the simultaneous actuation of the brake and the operator control element has been sensed.

10. The device of claim 1, wherein the device senses an actuation of a terminating operator control element and ends the automatic driving of the vehicle if the actuation of the terminating operator control element is sensed.

* * * * *

UNITED STATES PATENT AND TRADEMARK OFFICE
CERTIFICATE OF CORRECTION

PATENT NO. : 9,694,681 B2
APPLICATION NO. : 15/026625
DATED : July 4, 2017
INVENTOR(S) : Kleen et al.

It is certified that error appears in the above-identified patent and that said Letters Patent is hereby corrected as shown below:

On the Title Page

Column 1, under item (71), the Related U.S. Application Data should read as follows:
--(71) Applicant: VOLKSWAGEN AKTIENGESELLSCHAFT, Wolfsburg (DE)--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*